(12) United States Patent
Shimizu et al.

(10) Patent No.: US 7,058,313 B2
(45) Date of Patent: Jun. 6, 2006

(54) MULTI-VALUE MODULATION APPARATUS

(75) Inventors: Katsuhiro Shimizu, Tokyo (JP);
Kazuyuki Ishida, Tokyo (JP); Yukio Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 584 days.

(21) Appl. No.: 09/969,654

(22) Filed: Oct. 4, 2001

(65) Prior Publication Data

US 2002/0167705 A1    Nov. 14, 2002

(30) Foreign Application Priority Data

May 8, 2001    (JP) .............................. 2001-137126

(51) Int. Cl.
*H04B 10/04* (2006.01)

(52) U.S. Cl. ...................................... 398/186; 398/183

(58) Field of Classification Search ................ 398/182, 398/183, 186
See application file for complete search history.

(56) References Cited

U.S. PATENT DOCUMENTS

| | | | |
|---|---|---|---|
| 3,714,437 A | 1/1973 | Kinsel | |
| 5,510,919 A | 4/1996 | Wedding | |
| 5,706,116 A * | 1/1998 | Sugata | ........................ 398/182 |
| 6,407,845 B1 * | 6/2002 | Nakamoto | ................... 359/239 |
| 6,459,521 B1 * | 10/2002 | Bakker et al. | ............... 359/239 |

FOREIGN PATENT DOCUMENTS

| | | |
|---|---|---|
| EP | 0477875 A2 | 4/1992 |
| JP | 63005633 | 1/1988 |
| WO | PCT/JP00/07130 | 10/2000 |
| WO | WO 02/33921 A1 | 4/2002 |

OTHER PUBLICATIONS

Walklin et al., Journal of Lightwave Technology, vol. 17, No. 11, Nov. 1999, pp. 2235-2248.

* cited by examiner

*Primary Examiner*—David C. Payne
(74) *Attorney, Agent, or Firm*—Birch Stewart Kolasch & Birch LLP

(57) ABSTRACT

In the multi-value modulation apparatus, one optical intensity detecting unit detects optical intensity of a modulation optical signal generated by one optical modulation signal generating unit and output from the variable optical attenuator. The detected optical intensity is provided to the comparator. Another optical intensity detecting unit detects optical intensity of a modulation optical signal output from another optical modulation signal generating unit. The attenuator attenuates the optical intensity detected by the another optical intensity detecting unit, and provides it to the comparator. The output of the comparator is provided to the optical variable attenuator as a control signal. The variable optical attenuator controls optical intensity of the modulation optical signal based on the control signal.

15 Claims, 8 Drawing Sheets

MULTI-VALUE MODULATION APPARATUS

FIELD OF THE INVENTION

The present invention relates to a multi-value modulation apparatus used in an optical communication system. More particularly, this invention relates to a multi-value modulation apparatus, which is preferably applicable to an ultra high-speed communication system or a large-capacity optical communication system.

BACKGROUND OF THE INVENTION

In order to meet great demands of transmission capacity with respect to an optical communication system, a wavelength multiplex transmission system has been developed. The capacity of wavelength multiplex transmission system is determined by a product of transmission capacity per wavelength and a wavelength number; for this reason, it is desired to increase a transmission capacity per wavelength and the wavelength number.

A practical use by 10 Gbps has been so far performed as a transmission capacity per wavelength, and the study and development have been made in order to realize a 40-Gbps transmission capacity. However, there is a limit in a response speed of an optical modulator, an optical modulator driver, an optical electronic device such as photo-diode, electronic circuits; for this reason, it is very difficult to increase the response speed. Thus, it is greatly expected to develop a communication method having no limit of device response speed. As one of the communication method, there is an amplitude modulation multi-valued coding communication method (hereinafter, referred to "multi-valued modulation method").

For example, in the case of a binary 10 Gbps signal, a time slot width given to one bit is 100 ps. When two 10 Gbps binary codes are converted into one quaternary code, two bits are represented in the same time slot width 100 ps; therefore, it is possible to realize a 20-Gbps transmission capacity without increasing a device response speed.

Moreover, when four 10 Gbps binary codes are converted into one hexadecimal code, four bits are represented in a time slot width 100 ps; therefore, it is possible to realize a 40-Gbps transmission capacity. As described above, the multi-valued modulation method is a method effective for increasing a transmission capacity without receiving the limit of device response speed.

In order to increase a wavelength number in the wavelength multiplex transmission system, an interval between adjacent wavelengths must be made narrow. To give an example of the factor of limiting the wavelength interval, there are a stability of light source, a wavelength accuracy of optical composing/decomposing unit, and a modulation spectral width. The modulation spectral width of these factors is an essential problem. A half width of modulation spectrum is given by the reciprocal of time slot width.

For example, when a 10-Gbps binary code is converted into an optical intensity modulation signal, an optical spectral width is broadened into about 20 GHz (about 0.16 nm). For this reason, in the case of using a binary optical intensity modulation signal, it is difficult to set a wavelength interval to 0.16 nm or less.

The multi-valued modulation method is an effective method as the method of making narrow an optical spectral width without reducing a transmission capacity. As described above, according to the multi-valued modulation method, it is possible to realize a large transmission capacity without making narrow the time slot width. For example, when a quaternary code is used, it is possible to realize the same transmission capacity by an optical width spectrum width of half of the case of using a binary code. Thus, the multi-valued modulation method is a method effective for making narrow the wavelength interval in the wavelength multiplexing system.

Moreover, a narrowness of optical spectral width is effective to an influence by wavelength dispersion in an optical fiber transmission. The wavelength dispersion is a difference of propagation time by wavelength, and is a factor of pulse distortion. If the optical spectral width is narrow, a wavelength range included in optical signal becomes narrow; therefore, a pulse distortion becomes small. For this reason, it is expected that the multi-valued modulation method is effective to the influence by chromatic dispersion, which is a problem in the optical fiber transmission.

FIG. 10 is a block diagram showing a configuration 1 of a conventional multi-value modulation apparatus. The multi-valued modulating technology has been disclosed in the document, "Sheldon Waklin and Jan Conradi, "Multi-valued Signaling for Increasing the Reach of 10 Gb/s Light wave Systems", Journal of Light wave technology, Vol. 17, No. 11, pp. 2235–2248, 1999". In FIG. 10, the multi-valued modulation signal generating unit disclosed in the above document has been rewritten.

As shown in FIG. 10, the multi-value modulation apparatus comprises binary code generating units 60 and 61 which generates binary code signals having the same amplitude, an attenuator 62 which attenuates an output level of the binary code generating unit 61 to about half, a power synthesizer 63 which power-synthesizes an output of the binary code generating unit 60 and an output of the attenuator 62, and an electric/optical converter (E/O) 64 which converts an output of the power synthesizer 63 into an optical signal.

Operation of the conventional multi-value modulation apparatus will be described below with reference to FIG. 11. (a) indicates an output waveform of the binary code generating unit 60, and (b) indicates an output waveform of the attenuator 62. These signals are added together by the power synthesizer 63; as a result, a quaternary code signal as shown by (c) in FIG. 11 is obtained. The quaternary electric signal is converted into an optical signal having the same waveform by the electric/optical converter 64.

However, according to the configuration shown in FIG. 10, it is difficult to obtain the power synthesizer 63, which adds an electric signal without distortion, and further, it is difficult to obtain the electric/optical converter 64, which converts an obtained quaternary code electric signal into an optical signal without distortion. Many electric/optical converter practically used have a non-linear response characteristic. Therefore, a distortion is generated in conversion. For this reason, a problem arises such that it is difficult to obtain a multi-valued modulation optical signal having a small waveform distortion.

In order to actually obtain a multi-valued modulation optical signal having almost no distortion, for example, as shown in FIG. 12, there has been proposed a method, which does not add the electric signal, but adding an optical signal. FIG. 12 is a block diagram showing a configuration example 2 of the conventional multi-value modulation apparatus. FIG. 12 shows the configuration disclosed in Japanese Patent Application Laid-Open No. 63-5633 (optical multi-valued communication system).

As shown in FIG. 12, the multi-value modulation apparatus comprises optical modulation signal generating units 70 and 71 which output binary intensity modulation signals having different output amplitudes, respectively, and an optical composer 72 which composes binary intensity modulation optical signals output from the optical modulation signal generating units 70 and 71.

Operation of the conventional multi-value modulation apparatus will be described below with reference to FIG. 11. For example, the optical modulation signal generating units 70 outputs a modulation optical signal having a wave form as shown by (a) in FIG. 11, and the optical modulation signal generating units 71 outputs a modulation optical signal having a waveform as shown by (b) in FIG. 11. In this case, it is possible to obtain a quaternary multi-valued modulation optical signal as shown by (c) in FIG. 11 from the optical composer 72. According to this method, the addition of signal is performed by the optical composer. Therefore, a signal distortion is hard to be generated, and an ideal signal waveform is obtained.

However, according to the configuration shown in FIG. 12, there is a limit such that the optical modulation signal generating units 70 and 71 must output different waveform, or a polarized wave must be made orthogonal, in order to prevent a beat noise from generating by the composer of optical signal. In this case, if a signal has different wavelength, it is hard to be applied to a wavelength multiplexing system. Further, a problem arises such that an orthogonality of polarized wave is not always secured in a long distance transmission.

Moreover, in the case of adding two binary code optical signals, the amplitude of one optical signal must be controlled so as to be half of the other optical signal. However, in the above Publication, there is no disclosure relative to the control method. Further, the phase of two binary code optical signals must be controlled so that a timing when amplitude changes is coincident with each other in the case of the addition. However, in the above Publication, there is no disclosure relative to control unit, likewise.

SUMMARY OF THE INVENTION

It is an object of the present invention to provide a multi-value modulation apparatus, which can stably control an interval of multi-valued modulation optical signal to a predetermined value, and can match their phases when an amplitude change timing is different.

The multi-value modulation apparatus according to one aspect of this invention comprises N+1 (N≧1) number of optical modulation signal generating units, each optical modulation signal generating unit generating a binary modulation optical signal based on amplitude-modulation of an input electric signal; N number of optical intensity control units, each optical intensity control unit controlling an optical intensity of modulation optical signal output from a corresponding one of the optical modulation signal generating units based on a control signal; N+1 number of optical intensity detecting units, each optical intensity detecting unit detecting an optical intensity of modulation optical signal output from the optical modulation signal generating unit that does not have a corresponding optical intensity control unit, and an optical intensity of modulation optical signal controlled by a corresponding one of the optical intensity control units; a control unit which receives detection signals output from the optical intensity detecting units, and outputs the control signal to each the optical intensity control unit so that the optical intensity of modulation optical signal controlled by each the optical intensity control unit becomes a predetermined value, based on the optical intensity of modulation optical signal output from the optical modulation signal generating unit that does not have a corresponding optical intensity control unit; and an optical combining unit which combines the modulation optical signal output from the optical modulation signal generating unit that does not have a corresponding optical intensity control unit and the modulation optical signals controlled by each the optical intensity control unit to output a multi-valued modulation optical signal.

According to the above-mentioned invention, of the modulation optical signals generated by the N+1 (N≧1) optical modulation signal generating units, the optical intensity of the modulation optical signal generated by one optical modulation signal generating units is directly detected. Further, with respect to the optical intensity of the modulation optical signal generated by the remainder N optical modulation signal generating units, the optical intensity of the modulation optical signal controlled by the N optical intensity control units is detected. In the N+1 optical intensity signals detected in the above manner, the N optical intensity control units is controlled so that N optical intensity signals individually becomes a predetermined value, based on the directly detected optical intensity signal. By doing so, the multi-valued modulation optical signal output from the optical combining unit can be stably maintain in a state of having an equal or non-equal interval.

The multi-value modulation apparatus according to another aspect of this invention comprises a plurality of optical modulation signal generating units, each optical modulation signal generating unit generating a binary modulation optical signal based on amplitude-modulation of an input electric signal; an optical combining unit which combines modulation optical signals output from the optical modulation signal generating units to output a multi-valued modulation optical signal; and a non-linear optical medium having a transmittance changing non-linearly in accordance with an optical intensity of the multi-valued modulation optical signal output from the optical combining unit, and outputs a multi-valued modulation optical signal having a non-equal interval.

According to the above-mentioned invention, the multi-valued modulation optical signal output from optical combining unit is input into the non-linear optical medium so as to obtain a multi-valued modulation signal having a non-equal interval.

The multi-value modulation apparatus according to still another aspect of this invention comprises a plurality of optical modulation signal generating units, each optical modulation signal generating unit generating a binary modulation optical signal based on amplitude-modulation of an input electric signal; a light source which outputs an optical signal having a wavelength λ that is different from a wavelength of the modulation optical signals output from the optical modulation signal generating units; an optical combining unit which receives the modulation optical signals output from the optical modulation signal generating units and the optical signal having a wavelength λ output from the light source, combines the modulation optical signals to generate a multi-valued modulation optical signal, and outputs the multi-valued modulation optical signal and the optical signal having a wavelength λ; and a non-linear optical medium having a transmittance changing non-linearly in accordance with the multi-valued modulation optical signal and the optical signal having a wavelength λ output from the optical combining unit, the non-linear optical medium performing optical modulation on the optical signal having a wavelength λ based on the multi-valued modulation optical signal.

According to the above-mentioned invention, the multi-valued modulation optical signal output from the optical composer and an optical signal having a wavelength λ are input into the non-leaner optical medium. By doing so, in the non-linear optical medium, a transmittance non-linearly changes in accordance with the optical intensity of the input optical signal, and thereby, the non-linear optical medium performs an optical modulating operation of multi-valued-modulating an optical signal having a wavelength λ. Therefore, the non-linear optical medium can output an optical signal including the multi-valued modulation optical signal having a wavelength λ.

The multi-value modulation apparatus according to still another aspect of this invention comprises a plurality of optical modulation signal generating units, each optical modulation signal generating unit generating a binary modulation optical signal based on amplitude-modulation of an input electric signal; a plurality of delays, each delay controlling a delay of the modulation optical signal output from a corresponding one of the optical modulation signal generating units based on a control signal; an optical combining unit which combines the delayed modulation optical signals output from the delays to output a multi-valued modulation optical signal; an optical/electric converter which converts apart of the multi-valued modulation optical signal output from the optical combining unit into an electric signal; and a plurality of control units, each control unit detecting a correlation between the electric signal input into the optical modulation signal generating units and the electric signal output from the optical/electric converter, and outputting the control signal based on the detected correlation value.

According to the above-mentioned invention, when the phases of electric signals input into the plurality of optical modulation signal generating units are different from each other, the delay is controlled so that the correlation between the input electric signal and the modulation optical signal generated by the optical modulation signal generating units is taken, that is, so that their phases are coincident with each other. Therefore, it is possible to obtain a stable multi-valued modulation optical signal having a matched phase.

Other objects and features of this invention will become apparent from the following description with reference to the accompanying drawings.

DESCRIPTION OF THE PREFERRED EMBODIMENTS

Embodiments of multi-value modulation apparatus according to the present invention will be explained in detail below with reference to the accompanying drawings.

Figure 1:
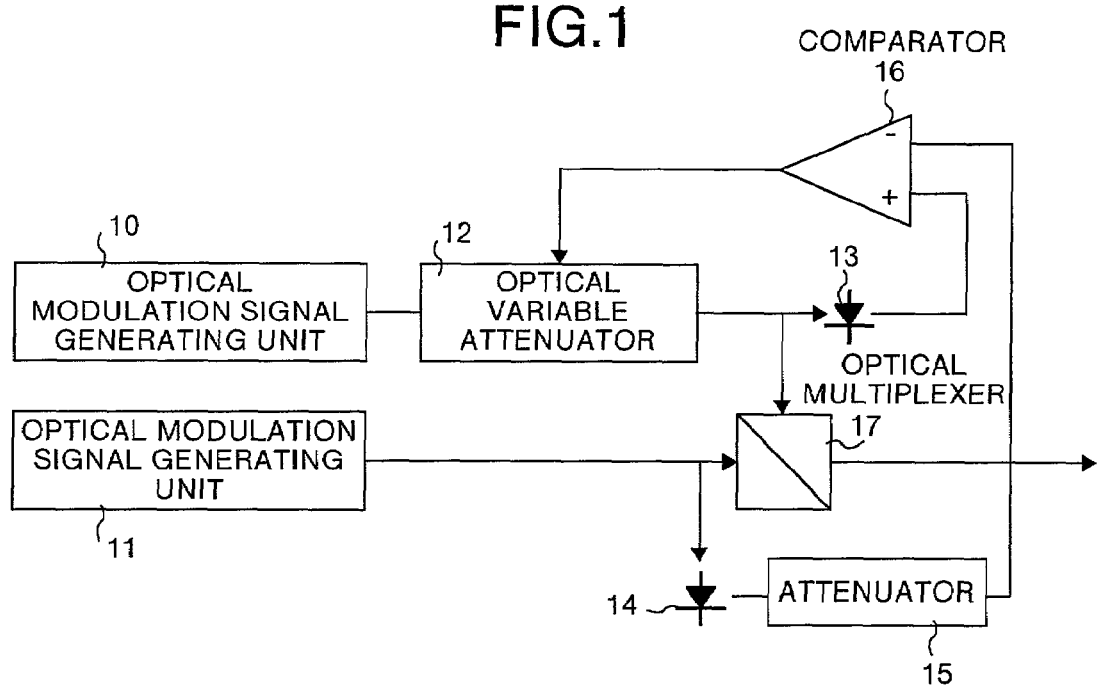
FIG. 1 is a block diagram showing a configuration of a multi-value modulation apparatus according to a first embodiment of the present invention.

FIG. 1 is a block diagram showing a configuration of a multi-value modulation apparatus according to a first embodiment of the present invention. As shown in FIG. 1, the multi-value modulation apparatus includes optical modulation signal generating units 10 and 11, variable optical attenuator 12 optical intensity detecting units 13 and 14, attenuator 15, comparator 16, and the optical multiplexer 17.

The optical modulation signal generating units 10 and 11 individually generate a binary amplitude modulation optical signal based on an input electric signal at a waveform or polarized wave different from each other. These optical modulation signal generating units 10 and 11 are composed of a general optical modulator used in an optical transmitter.

A modulation optical signal generated by the optical modulation signal generating unit 10 is input into the variable optical attenuator 12. The variable optical attenuator 12 is composed of a device in which an attenuation or gain is variable based on a control signal applied from the outside. The variable optical attenuator 12 adds a predetermined attenuation based on a control signal applied from the comparator 16 to the modulation optical signal generated by the optical modulation signal generating unit 10, and then, outputs it to the optical intensity detecting unit 13 and the optical multiplexer 17.

On the other hand, a modulation optical signal generated by the optical modulation signal generating unit 11 is input into the optical intensity detecting unit 14 and the optical multiplexer 17. The optical intensity detecting units 13 and 14 are individually composed of a photodiode, avalanche photodiode or the like, and output a level detection signal corresponding to the intensity of input optical signal. The optical intensity detecting unit 13 detects an output optical intensity of the variable optical attenuator 12, and then, outputs the detection signal to a positive-phase-sequence input terminal "+" of the comparator 16. Meanwhile, the optical intensity detecting unit 14 detects an optical intensity of the modulation optical signal generated by the optical modulation signal generating unit 11, and then, outputs the detection signal to the attenuator 15.

The attenuator 15 gives a predetermined attenuation to the detection signal output from the optical intensity detecting unit 14, and then, outputs it to a negative-phase-sequence input terminal "−". The comparator 16 operates a control signal to the variable optical attenuator 12 in accordance with a magnitude relation between the output level of the optical intensity detecting unit 13 and the output level of the attenuator 15. By doing so, a quaternary modulation optical signal having different wavelength or polarized wave is output from the optical composer 17.

Figure 2:
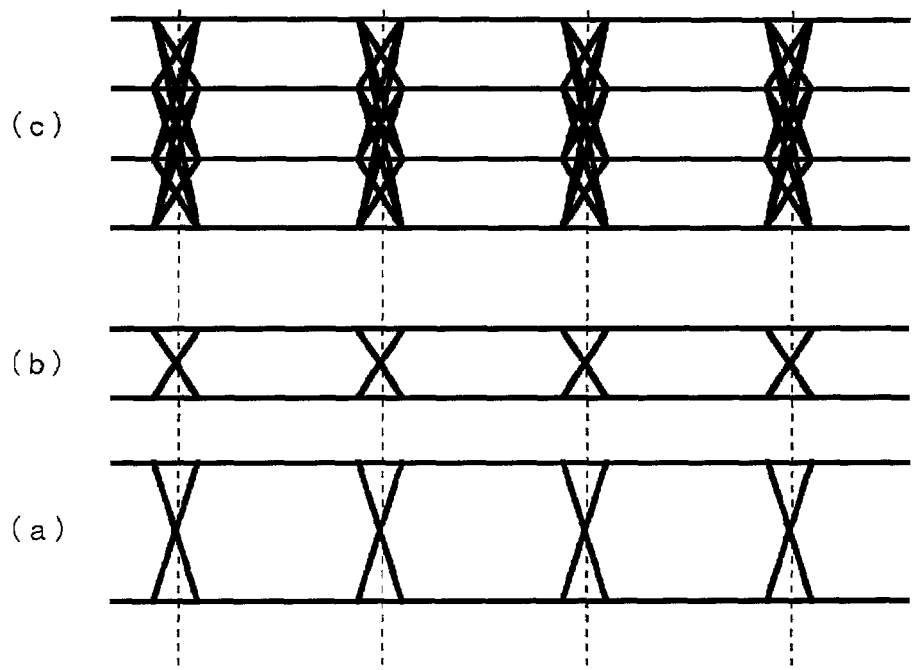
FIG. 2 is a view to explain an operation in the case of obtaining a quaternary modulation signal having an equal interval.
Figure 3:
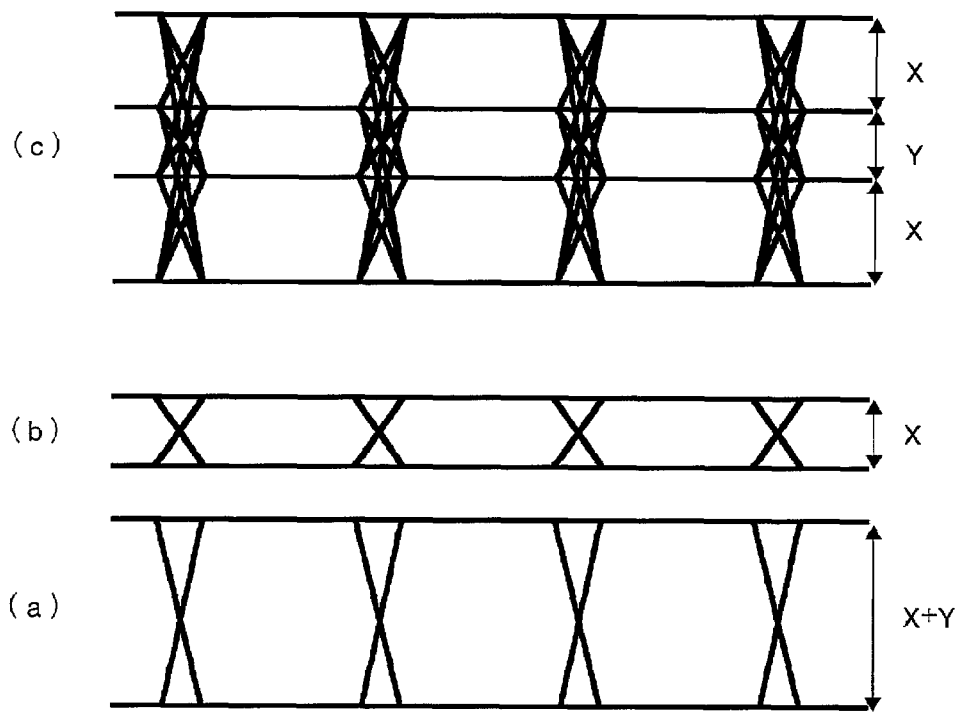
FIG. 3 is a view to explain an operation in the case of obtaining a quaternary modulation signal having a non-equal interval.

Operation of the multi-value modulation apparatus according to the first embodiment will be described below with reference to FIG. 1 to FIG. 3. FIG. 2 is a view to explain an operation when obtaining a quaternary modulation optical signal having an equal interval. FIG. 3 is a view to explain an operation of the case of obtaining a quaternary modulation optical signal having a non-equal interval.

In this first embodiment, it is possible to obtain a quaternary modulation optical signal having an equal interval as shown by (c) in FIG. 2, and to a quaternary modulation optical signal having a non-equal interval as shown by (c) in FIG. 3. In this case, each interval of the obtained quaternary modulation optical signal can be stably controlled to a predetermined value.

First, in order to obtain a quaternary modulation optical signal having an equal interval as shown by (c) in FIG. 2, the modulation optical signal input into the optical multiplexer 17 must have an amplitude ratio of 2:1, as shown by (a) and (b) in FIG. 2. In FIG. 1, the following assumption is made. If the optical intensity of the modulation optical signal input directly to the optical multiplexer 17 from the optical modulation signal generating unit 11 is set to "1", the optical intensity of the modulation optical signal input into the optical multiplexer 17 from the optical modulation signal generating unit 10 via the variable optical attenuator 12 is set to "2".

The optical modulation signal generating unit 10 and 11 individually generate a binary amplitude modulation optical signal having arbitrary optical intensity. In this case, for simplification of explanation, these generating units 10 and 11 generate a binary amplitude modulation optical signal having an approximately equal optical intensity.

The optical intensity of the modulation optical signal input into the optical multiplexer 17 from the optical modulation signal generating unit 10 via the variable optical attenuator 12 is detected by the optical intensity detecting unit 13, and then, is input into the positive-phase-sequence input terminal "+" of the comparator 16.

On the other hand, the optical intensity of the modulation optical signal input directly to the optical multiplexer 17 from the optical modulation signal generating unit 11 is detected by the optical intensity detecting unit 13, and then, is input into the negative-phase-sequence input terminal "−" of the comparator 16 via the attenuator 15. In this case, the attenuator 15 is set so as to attenuate a detection optical intensity detected by the optical intensity detecting unit 13 to 50%.

As a result, when the detection optical intensity detected by the optical intensity detecting unit 13 is stronger, the comparator 16 outputs a control signal for making large the attenuation of the variable optical attenuator 12. On the other hand, when the detection optical intensity detected by the optical intensity detecting unit 14 and attenuated to 50% by the attenuator 15 is stronger, the comparator 16 outputs a control signal for making small the attenuation of the variable optical attenuator 12.

The feedback control as described above is performed, and thereby, it is possible to stably equalize each interval of the quaternary modulation optical signal output from the optical multiplexer 17.

Moreover, in order to obtain a quaternary modulation optical signal having a non-equal interval as shown by (c) in FIG. 3, the modulation optical signal input into the optical multiplexer 17 must have an amplitude ratio of X+Y: X, as shown by (a) and (b) in FIG. 3.

In the example shown in FIG. 2, the case of X=Y is considered. Thus, in the case of X≠Y, the above method is applicable, likewise. The attenuation by the attenuator 15 is adjusted, and thereby, it is possible to adjust each interval of X and Y, and thus, to stabilize the quaternary modulation optical signal. The quaternary modulation optical signal having a non-equal interval is effective in a system using an optical amplifier, a system using an avalanche photodiode or the like, as described later.

This first embodiment has described the case of stabilizing each interval of the quaternary modulation optical signal. The number of the optical modulation signal generating units and the variable optical attenuators is increased, and control unit to each variable optical attenuator is provided, and thereby, it is possible to stabilize each interval of the quaternary modulation optical signal.

Moreover, this first embodiment has described the method of controlling the output optical intensity of the optical modulation signal generating unit 10 using the variable optical attenuator 12. It is possible to a method of controlling a signal level input into the optical modulation signal generating unit 10. In this case, the variable optical attenuator 12 is omitted, and a variable electric signal attenuator is provided on an input stage of the optical modulation signal generating unit 10, and further, an attenuation of the variable electric signal attenuator is controlled by a control signal from the comparator 16. In the configuration, it is possible to stabilize each interval of multi-valued modulation signal having a quaternary or more.

Figure 4:
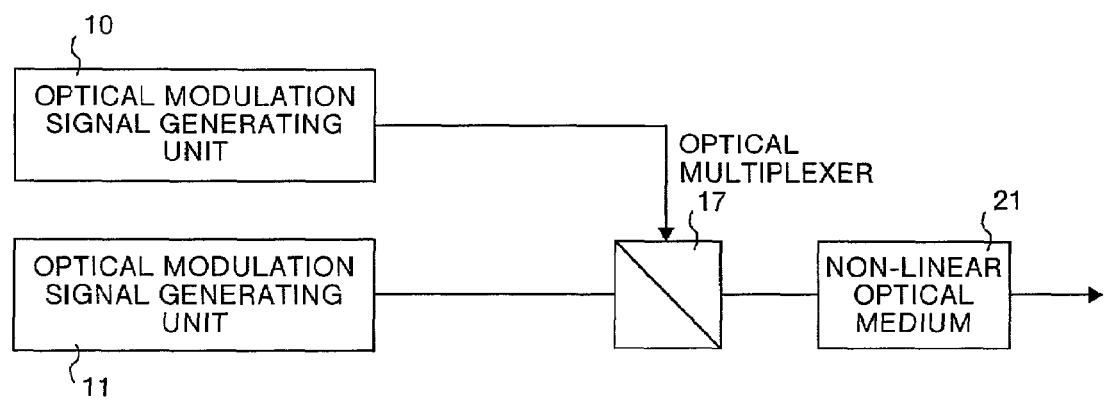
FIG. 4 is a block diagram showing a configuration of a multi-value modulation apparatus according to a second embodiment of the present invention.

FIG. 4 is a block diagram showing a configuration of a multi-value modulation apparatus according to a second embodiment of the present invention. In FIG. 4, like reference numerals are used to designate the same constituent elements as those shown in FIG. 1. In the following embodiments, like reference numerals are used, likewise.

As shown in FIG. 4, the multi-value modulation apparatus comprises optical modulation signal generating units 10 and 11 which generate binary amplitude modulation optical signals having wavelengths or polarized waves different from each other, an optical composer 17 which composes modulation optical signals output from the optical modulation signal generating units 10 and 11, and a non-linear optical medium 21 which receives optically composed multi-valued modulation signal output from the optical composer 17.

The non-linear optical medium 21 is composed of a device such that a transmittance non-linearly varies when an insertion loss or gain changes in accordance with an optical intensity of input optical signal, for example, a semiconductor optical modulator, a semiconductor optical amplifier or the like.

Figure 5:
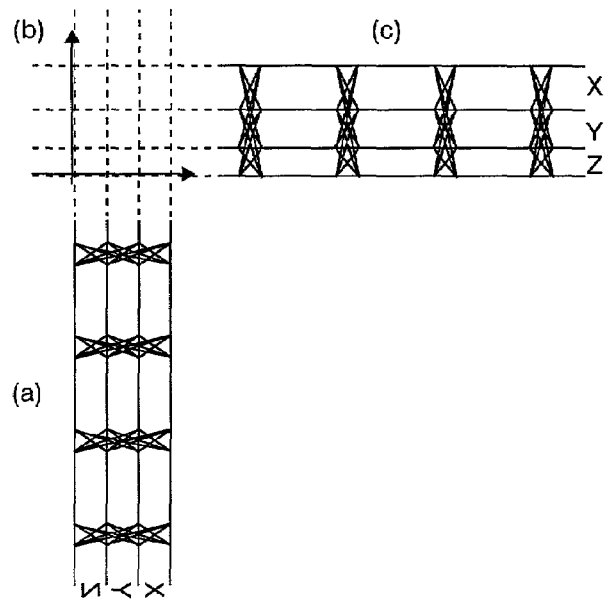
FIG. 5 is a view to explain an operation of the non-linear optical medium shown in FIG. 4.

Operation of the multi-value modulation apparatus according to the second embodiment will be described below with reference to FIG. 5. FIG. 5 is a view to explain an operation of the non-linear optical medium 21. In FIG. 5, (a) is a view showing a quaternary modulation optical signal output from the optical multiplexer 17. In this case, it is assumed that the interval is equal as in the case of FIG. 2. (b) is a view showing an input-output characteristic of the non-linear optical medium 21, and (c) is a view showing a quaternary modulation optical signal having non-equal intervals, output from the non-liner optical medium 21.

As shown by (b), the non-linear optical medium 21 has a characteristic such that an insertion loss becomes small when an input optical intensity is strong, and becomes larger when it is weak. For this reason, when the input optical intensity is low, an output optical intensity becomes small; on the other hand, when the input optical intensity is high, an output optical intensity becomes larger.

Therefore, when the quaternary modulation optical signal as shown by (a) in FIG. 5 is input into the non-linear optical medium 21 having an input-output characteristic shown by (b) in FIG. 5, a quaternary modulation optical signal having a non-equal interval as shown by (c) in FIG. 5 is obtained. In this case, the obtained quaternary modulation optical signal has interval such that X>Y>Z.

This second embodiment has described the case of obtaining the quaternary modulation optical signal having a non-equal interval. The number of the optical modulation signal generating units is increased, and thereby, it is possible to obtain a quaternary or more modulation optical signal having a non-equal interval.

The quaternary modulation optical signal having a non-equal interval is effective in a system using an optical amplifier, a system using an avalanche photodiode or the like. In the systems using these amplifier and photodiode, a noise level becomes large in proportional to a signal amplitude; therefore, it has been known that interval relation of X>Y>Z is required for securing a signal to noise ratio.

Figure 6:
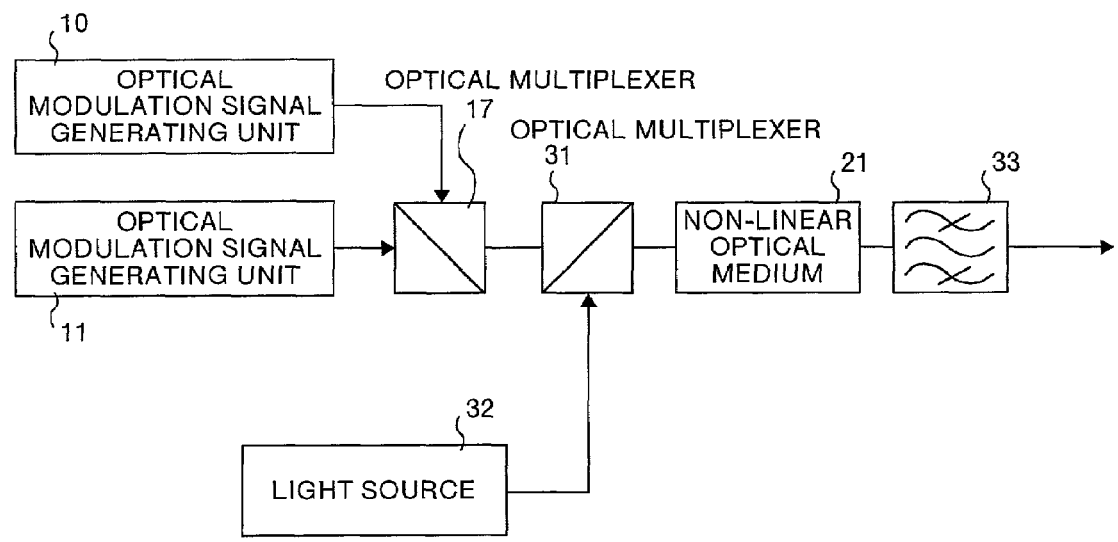
FIG. 6 is a block diagram showing a configuration of a multi-value modulation apparatus according to a third embodiment of the present invention.

FIG. 6 is a block diagram showing a configuration of a multi-value modulation apparatus according to a third embodiment of the present invention. According to this third embodiment, in addition to the configuration shown in FIG. 4, an optical multiplexer 31 and a light source 32 for outputting an optical signal having a wavelength λ to the optical multiplexer 31 are interposed between the optical multiplexer 17 and the non-linear optical medium 21. Further, an optical filter 33 receiving an output from the non-linear optical medium 21 is provided. In this case, the wavelength λ output by the light source 32 is different from a wavelength of the modulation optical signal output from the optical modulation signal generating units 10 and 11. Moreover, the optical filter 33 is manufactured so as to pass through an optical signal having a wavelength λ.

As described above, the insertion loss of the non-linear optical medium 21 changes by the optical intensity of the multi-valued modulation signal output from the optical multiplexer 31; therefore, the non-linear optical medium 21 functions as one of optical modulator. More specifically, when a optical signal having a wavelength λ from the light source 32 and the multi-valued modulation optical signal from the optical multiplexer 17 are optically multiplexed, and input into the non-linear optical medium 21, the optical signal having a wavelength λ is modulated by the multi-valued modulation optical signal in the non-linear optical medium 21. The optical signal is passed through the optical filter 33, and thereby, it is possible to take out only multi-valued modulation optical signal having a wavelength λ. The multi-valued modulation optical signal having a wavelength λ has a constant polarized wave having no relation with a polarized wave of the modulation optical signal output from the optical modulation signal generating units 10 and 11.

By the way, in order to prevent a beat noise from generating by the composer of optical signal, there is a limitation such that a wavelength or polarized wave output by the optical modulation signal generating units 10 and 11 must be made perpendicular. In this case, if the signal has a different wavelength, it is difficult to apply these means to a wavelength multiplexing system. Further, a problem arises such that a quadrature of polarized wave is not always secured in a long distance transmission.

However, the multi-valued modulation optical signal obtained by the multi-value modulation apparatus shown in FIG. 6 of the third embodiment has a constant wavelength and a constant polarized wave as described above. Therefore, it is possible to solve the above difficult problem.

FIG. 6 shows two optical multiplexers. Of course, one optical multiplexer may be constructed so as to optically composer the optical signal having a wavelength X and the output optical signal of the plurality of optical modulation signal generating units, depending upon the relation between the number of optical modulation signal generating units and the number of input ports receiving output optical signals from them.

Figure 7:
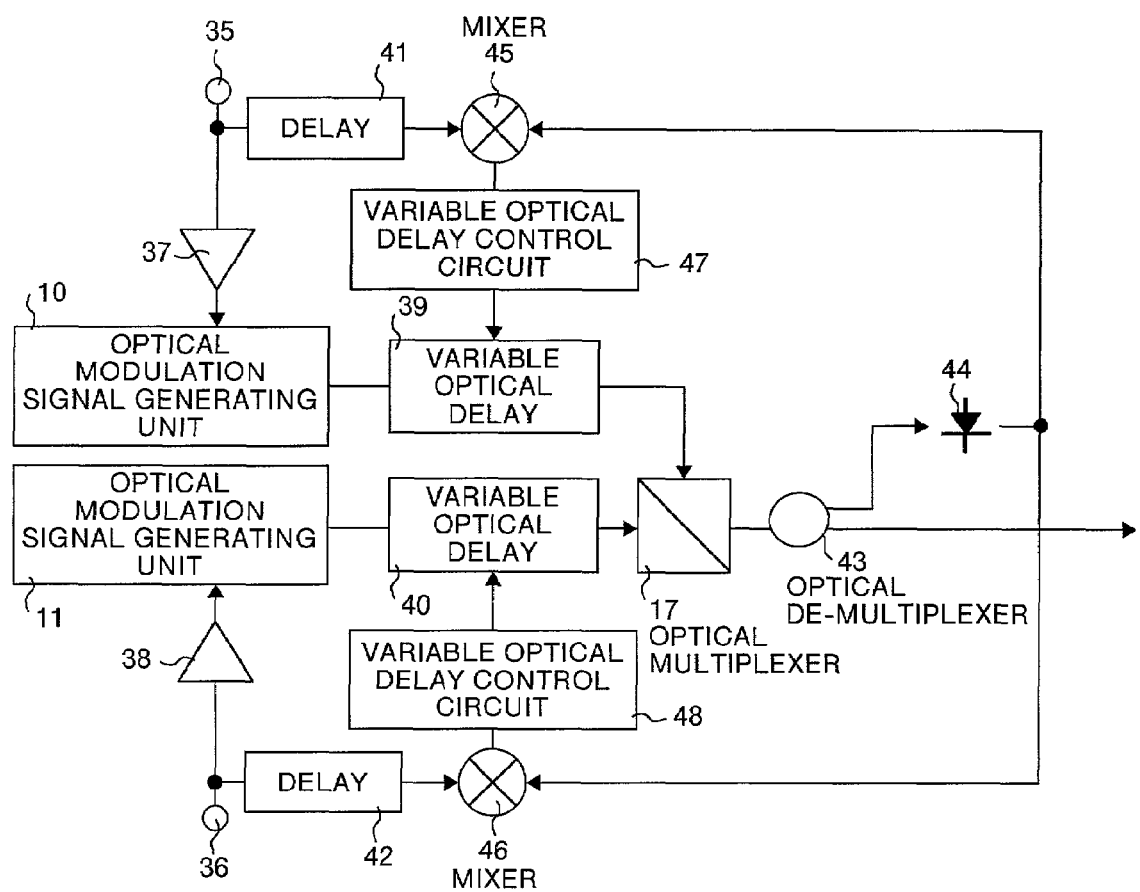
FIG. 7 is a block diagram showing a configuration of a multi-value modulation apparatus according to a fourth embodiment of the present invention.

FIG. 7 is a block diagram showing a configuration of a multi-value modulation apparatus according to a fourth embodiment of the present invention. FIG. 7 shows the case where two modulation optical signals are multiplexed. This fourth embodiment provides a multi-value modulation apparatus, which can automatically uniform and stabilize a phase relation when change point time positions of plural modulation optical signals are shifted each other.

As shown in FIG. 7, the multi-value modulation apparatus includes input terminals 35 and 36, to which a transmission signal is applied, optical modulation signal generating unit drive circuits 37 and 38, optical modulation signal generating units 10 and 11, variable optical delays 39 and 40, delays 41 and 42, optical multiplexer 17, optical de-multiplexer 43, optical/electric converter 44, mixers 45 and 46, and variable optical delay control circuits 47 and 48.

One transmission signal input into the input terminal 35 is input into the optical modulation signal generating unit drive circuit 37 and the delay 41. The delay 41 properly delays one transmission signal input from the input terminal 35, and then, gives it to one input port of the mixer 45. The optical modulation signal generating unit drive circuit 37 drives the optical modulation signal generating unit 10 in amplitude and modulation according to one transmission signal input from the input terminal 35. By doing so, a binary amplitude modulation optical signal is output from the optical modulation signal generating unit 10 to the variable optical delay 39. The variable optical delay 39 properly delays the input binary amplitude modulation optical signal according to a control signal from the variable optical delay control circuit 47, and then, outputs it to one input port of the optical multiplexer 17.

Moreover, the other transmission signal input into the input terminal 36 is input into the optical modulation signal generating unit drive circuit 38 and the delay 42. The delay 42 properly delays one transmission signal input from the input terminal 36, and then, gives it to one input port of the mixer 46. The optical modulation signal generating unit drive circuit 38 drives the optical modulation signal generating unit 11 in amplitude and modulation according to one transmission signal input from the input terminal 36. By doing so, a binary amplitude modulation optical signal is output from the optical modulation signal generating unit 11 to the variable optical delay 40. The variable optical delay 40 properly delays the input binary amplitude modulation optical signal according to a control signal from the variable optical delay control circuit 48, and then, outputs it to the other input port of the optical multiplexer 17.

The quaternary amplitude modulation optical signal multiplexed by the optical multiplexer 17 is divided into two signals by the optical de-multiplexer 43. One of two signals is output to the outside, and the other of them is converted into an electric signal by the optical/electric converter 44. The electric signal converted by the optical/electric converter 44 is input into the other input port of the mixers 45 and 46.

The mixer 45 multiplies one transmission signal input from the delay 41 and the electric signal converted by the optical/electric converter 44, that is, takes a correlation between two input signals, and then, outputs a signal indicative of a phase relation between two input signals to the variable optical delay control circuit 47. The signal indicative of a phase relation between two input signals is a signal, which becomes the maximum value when each phase of two input signals is coincident with each other. The variable optical delay control circuit 47 outputs a control signal according to the output signal of the mixer 45 to the variable optical delay 39 so that a delay amount by the variable optical delay 39 can be controlled.

Moreover, the mixer 46 multiplies the other transmission signal input from the delay 42 and the electric signal converted by the optical/electric converter 44, that is, takes a correlation between two input signals, and then, outputs a signal indicative of a phase relation between two input signals to the variable optical delay control circuit 48. The signal indicative of a phase relation between two input signals is a signal, which becomes the maximum value when each phase of two input signals is coincident with each other. The variable optical delay control circuit 48 outputs a control signal according to the output signal of the mixer 46 to the variable optical delay 40 so that a delay by the variable optical delay 40 can be controlled.

Operation of the multi-value modulation apparatus according to the fourth embodiment will be described below with reference to FIG. 8. (a) indicates a modulation optical signal output from the variable optical delay 39, and (b) indicates a modulation optical signal output from the variable optical delay 40.

Figure 8:
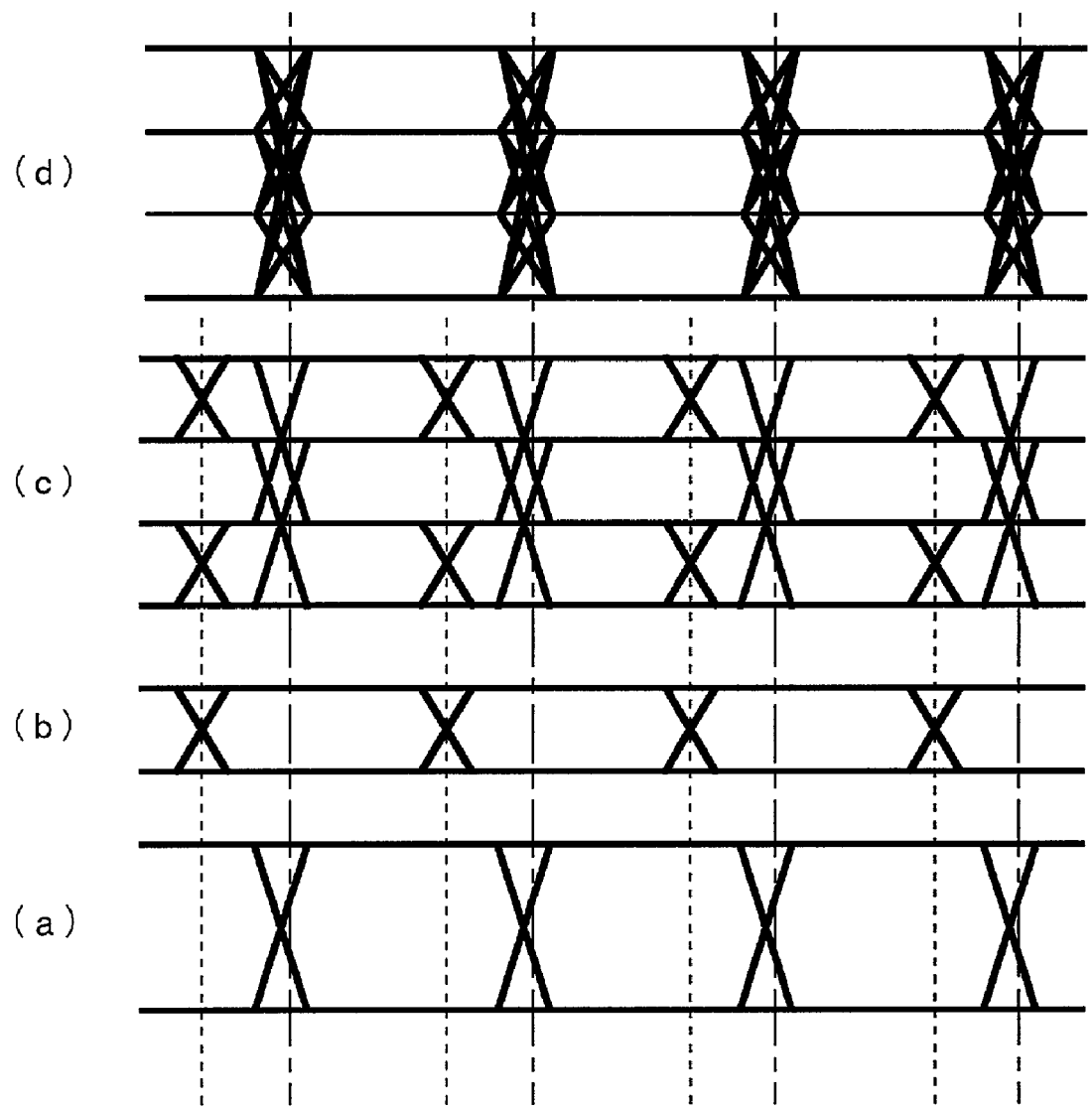
FIG. 8 is a view to explain an operation of the fourth embodiment of the present invention.

When a positional relation of change point time of the multiplexed modulation optical signal is shifted, the modulation optical signal output from the optical multiplexer 17 has a distortion waveform as shown by (c) in FIG. 8. As a result, an ideal multi-valued modulation waveform is not obtained.

In this fourth embodiment, a phase relation between two modulation optical signals is automatically controlled using the variable optical delays 39 and 40. More specifically, the mixer 45 takes a correlation between an electric signal output from the optical/electric converter 44 and one transmission signal output from the delay 41, and then, outputs a signal indicative of the maximum value when the phase of two signals makes a coincidence. The variable optical delay control circuit 47 controls a delay amount by the variable optical delay 39 so that the output signal of the mixer 45 becomes the maximum. As a result, the electric signal output from the optical/electric converter 44 is stabilized having a predetermined phase relation with one transmission signal input from the input terminal 35.

Likewise, the mixer 46 takes a correlation between an electric signal output from the optical/electric converter 44 and the other transmission signal output from the delay 42, and then, outputs a signal indicative of the maximum value when the phase of two signals makes a coincidence. The variable optical delay control circuit 48 controls a delay amount by the variable optical delay 40 so that the output signal of the mixer 46 becomes the maximum. As a result, the electric signal output from the optical/electric converter 44 is stabilized having a predetermined phase relation with the other transmission signal input from the input terminal 36.

The phase relation between one transmission signal input from the input terminal 35 and the other transmission signal input from the input terminal 36 is reflected in the electric signal output from the optical/electric converter 44. The correlation is taken by each of the mixer 45 and 46, and each delay by the variable optical delays 39 and 40 is controlled, and thereby, the multi-valued modulation optical signal output from the optical multiplexer 17 becomes a multi-valued modulation signal having a matched phase as shown by (d) in FIG. 8.

In FIG. 7, the mixer has been used as correlation detecting unit. Other devices may be of course used so long as they can take the correlation between two signals. For example, a digital integrator, an analog integrator and the like may be applicable. Moreover, the variable optical delay control circuit can be simply realized by combining a low-pass filter, an analog-digital converter, a CPU, and a digital-analog converter.

Figure 9:
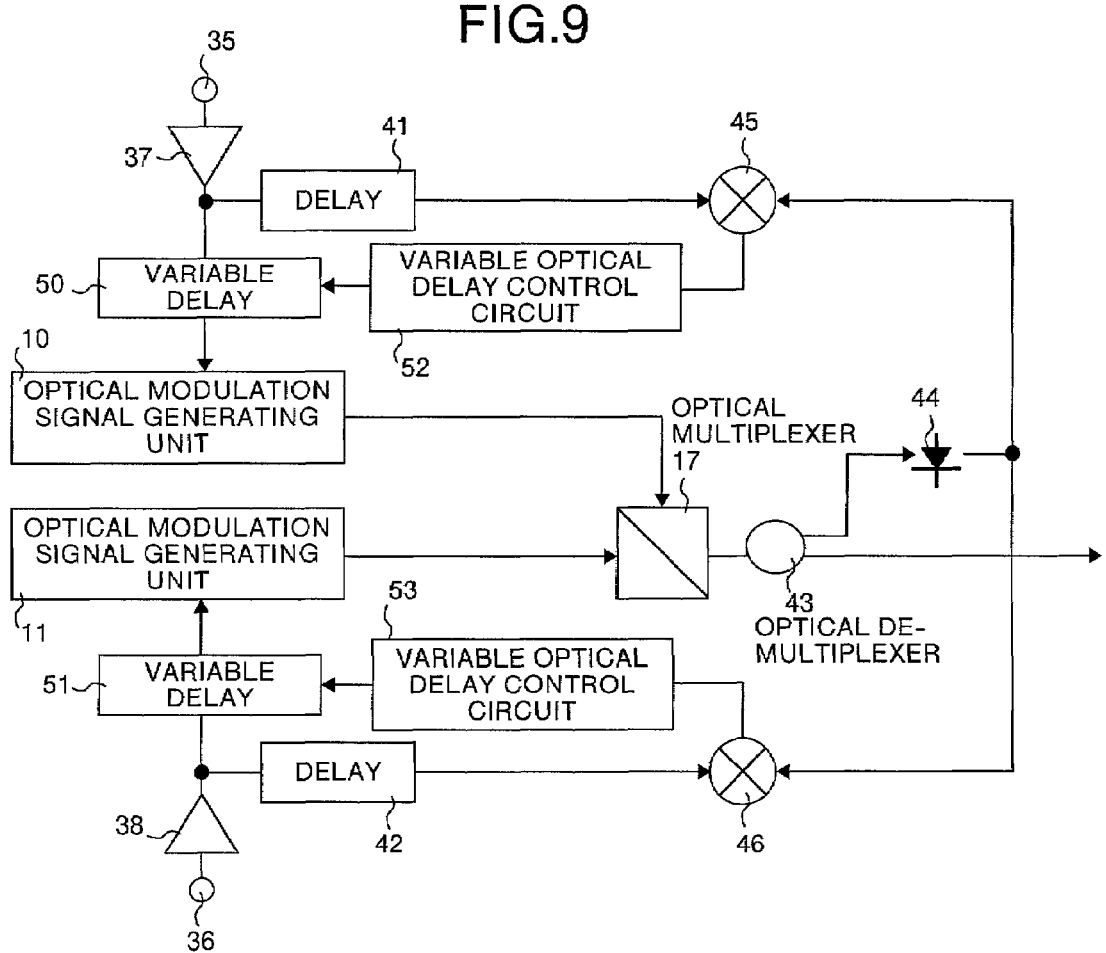
FIG. 9 is a block diagram showing a configuration of a multi-value modulation apparatus according to a fifth embodiment of the present invention.
Figure 10:
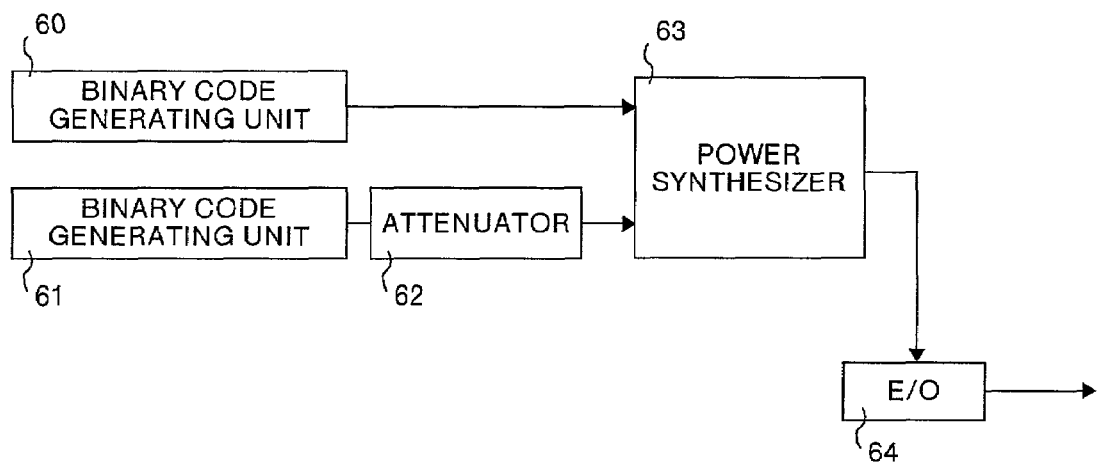
FIG. 10 is a block diagram showing a configuration example 1 of a conventional multi-value modulation apparatus.
Figure 11:
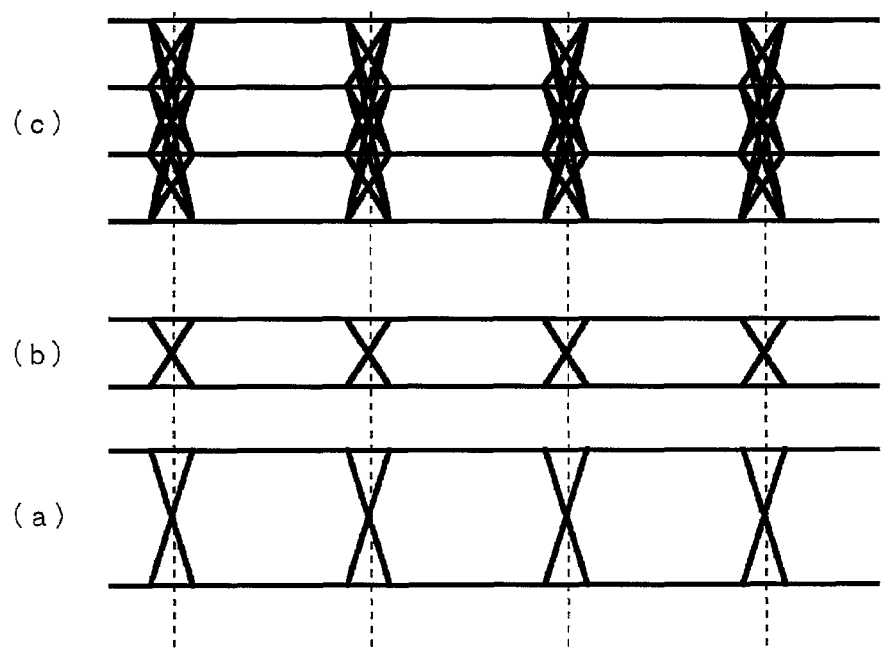
FIG. 11 is a view to explain an operation of the conventional multi-value modulation apparatus.
Figure 12:
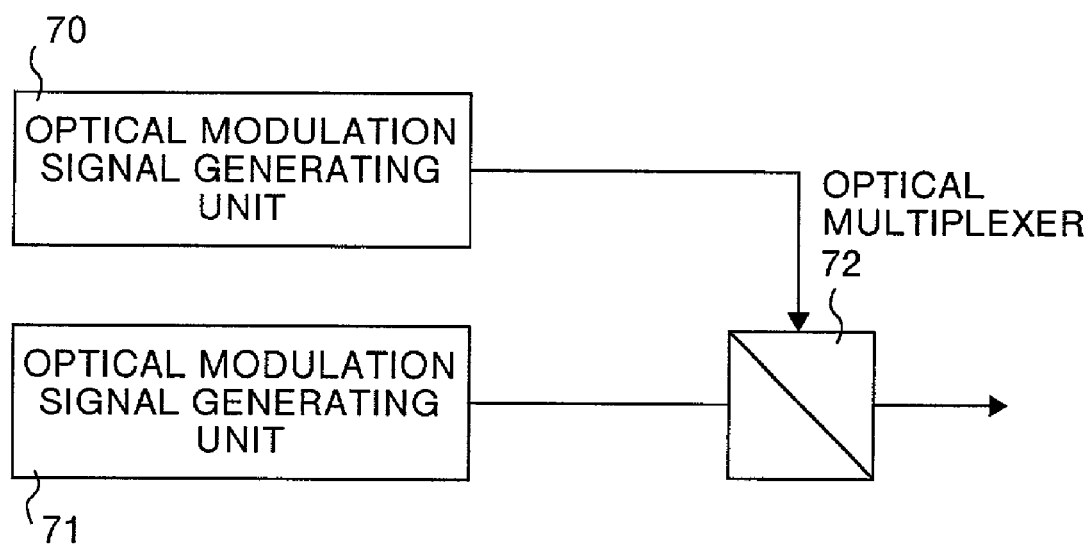
FIG. 12 is a block diagram showing a configuration example 2 of a conventional multi-value modulation apparatus.

FIG. 9 is a block diagram showing a configuration of a multi-value modulation apparatus according to a fifth embodiment of the present invention. This fifth embodiment shows an example realizing the same function as the above fourth embodiment by another configuration.

That is, in the configuration shown in FIG. 9, instead of the variable optical delays 39 and 40, a variable delay 50 for delaying an electric signal is provided between the optical modulation signal generating unit drive circuit 37 and the optical modulation generating unit 10, and a variable delay 51 for delaying an electric signal is provided between the optical modulation signal generating unit drive circuit 38 and the optical modulation signal generating unit 11. Instead of the variable optical delay control circuits 47 and 48, there is provided a variable delay control circuits 52 which controls a delay amount at the variable delay 50 on the basis of an output of the mixer 45 and a variable delay control circuit 53 which controls a delay amount at the variable delay 51 on the basis of an output of the mixer 46.

According to this configuration, the same effects as the fourth embodiment can be obtained, and in addition, the variable delay for delaying an electric signal is used; therefore, the multi-value modulation apparatus can be readily realized.

As evident from the above description, according to the present invention, the optical intensity of the optical signal output from the optical modulation signal generating units is controlled based on the optical intensity signal detected by the optical intensity detecting units. Therefore, it is possible to obtain a multi-valued modulation optical signal having a stabile interval.

Furthermore, the optical intensity of the modulation optical signal output from the optical modulation signal generating units is controlled in an input or output stage of the optical modulation signal generating units.

According to the present invention, the multiplexed multi-valued modulation optical signal is input into the non-linear optical medium so as to obtain a multi-valued modulation signal having a non-equal interval. Therefore, it is possible to obtain a multi-valued modulation signal having an interval suitable for optical transmission system.

According to the present invention, the multi-valued modulation optical signal output from the optical multiplexer and an optical signal having a wavelength λ are input into the non-leaner optical medium. Therefore, it is possible to obtain an optical signal including a multi-valued modulation optical signal having a wavelength λ.

According to the present invention, it is possible to obtain a multi-valued modulation optical signal having a wavelength λ input into the non-leaner optical medium by using the optical filter. Therefore, it is possible to obtain a multi-valued modulation optical signal having a constant wavelength or polarized wave.

According to the present invention, when the phases of electric signals input into the plurality of optical modulation signal generating units are different from each other, the delay is controlled so that the phases of the input electric signal and the modulation optical signal generated by the optical modulation signal generating units are coincident with each other. Therefore, it is possible to obtain a stable multi-valued modulation optical signal having a matched phase.

Further, according to the present invention, the delay of the modulation optical signal output from the plurality of optical modulation signal generating units is controlled in an input or output stage of the plurality of optical modulation signal generating units.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A multi-value modulation apparatus comprising:
N+1 (N≧1) number of optical modulation signal generating units, each optical modulation signal generating unit generating a binary modulation optical signal based on amplitude-modulation of an input electric signal;
N number of optical intensity control units, each optical intensity control unit controlling an optical intensity of modulation optical signal output from a corresponding one of said optical modulation signal generating units based on a control signal;
N+1 number of optical intensity detecting units, each one of N optical intensity detecting units detecting an optical intensity of modulation optical signal output from a corresponding one of said optical intensity control unit, and N+1-th optical intensity detecting unit detecting an optical intensity of modulation optical signal output from said optical modulation signal generating unit that does not have a corresponding optical intensity control unit;
a control unit which receives detection signals output from said optical intensity detecting units, and outputs the control signal to each said optical intensity control unit so that the optical intensity of modulation optical signal controlled by each said optical intensity control unit becomes a predetermined value, based on the optical intensity of modulation optical signal output from said optical modulation signal generating unit that does not have a corresponding optical intensity control unit; and
an optical combining unit which combines the 5 modulation optical signal output from said optical modulation signal generating unit that does not have a corresponding optical intensity control unit and the modulation optical signals controlled by each said optical intensity control unit to output a multi-valued modulation optical signal.

2. The multi-value modulation apparatus according to claim 1, wherein each one of said optical intensity control units is a variable electric signal attenuator that controls a level of the electric signal input into a corresponding one of said optical modulation signal generating units based on the control signal.

3. The multi-value modulation apparatus according to claim 1, wherein each one of said optical intensity control units is a variable optical attenuator that controls the optical intensity of modulation optical signal generated by a corresponding one of said optical modulation signal generating units based on the control signal.

4. The multi-value modulation apparatus according to claim 1, further comprising an attenuation unit provided between said N+1-th optical intensity detecting unit and said control unit, said attenuation unit attenuating the optical intensity of modulation optical signal detected by said N+1-th optical intensity detecting unit.

5. The multi-value modulation apparatus according to claim 1, wherein said attenuation unit attenuating the optical intensity of modulation optical signal detected by said N+1-th optical intensity detecting unit by 30 to 50%.

6. A multi-value modulation apparatus comprising:
a plurality of optical modulation signal generating units, each optical modulation signal generating unit generating a binary modulation optical signal based on amplitude-modulation of an input electric signal;
an optical combining unit which combines modulation optical signals output from said optical modulation signal generating units to output a multi-valued modulation optical signal; and
a non-linear optical medium having a transmittance changing non-linearly in accordance with an optical intensity of the multi-valued modulation optical signal output from said optical combining unit, and outputs a multi-valued modulation optical signal having a non-equal interval.

7. A multi-value modulation apparatus comprising:
a plurality of optical modulation signal generating units, each optical modulation signal generating unit generating a binary modulation optical signal based on amplitude-modulation of an input electric signal;
a light source which outputs an optical signal having a wavelength λ that is different from a wavelength of the modulation optical signals output from said optical modulation signal generating units;
an optical combining unit which receives the modulation optical signals output from said optical modulation signal generating units and the optical signal having a wave length λ output from said light source, combines the modulation optical signals to generate a multi-valued modulation optical signal, and outputs the multi-valued modulation optical signal and the optical signal having a wavelength λ; and
a non-linear optical medium having a transmittance changing non-linearly in accordance with the multi-valued modulation optical signal and the optical signal having a wavelength λ output from said optical combining unit, said non-linear optical medium performing optical modulation on the optical signal having a wavelength λ based on the multi-valued modulation optical signal.

8. The multi-value modulation apparatus according to claim 7, further comprising an optical filter for taking a multi-valued modulation optical signal having a wavelength λ from the output of said non-linear optical medium.

9. A multi-value modulation apparatus comprising:
a plurality of optical modulation signal generating units, each optical modulation signal generating unit generating a binary modulation optical signal based on amplitude-modulation of an input electric signal;
a plurality of delays, each delay controlling a delay of the modulation optical signal output from a corresponding one of said optical modulation signal generating units based on a control signal;
an optical combining unit which combines the delayed modulation optical signals output from said delays to output a multi-valued modulation optical signal;
an optical/electric converter which converts a part of the multi-valued modulation optical signal output from said optical combining unit into an electric signal; and
a plurality of control units, each control unit detecting a correlation between the electric signal input into said optical modulation signal generating units and the electric signal output from said optical/electric converter, and outputting the control signal to a corresponding one of said delays based on the detected correlation value.

10. The multi-value modulation apparatus according to claim 9, wherein each one of said delay is a variable electric signal delay that delays the electric signal input into a corresponding one of said optical modulation signal generating units based on the control signal.

11. The multi-value modulation apparatus according to claim 9, wherein each one of said delay is a variable optical is delay that delays the modulation optical signal generated by a corresponding one of said optical modulation signal generating units based on the control signal.

12. The apparatus of claim 9, wherein each control unit detecting a predetermined phase relation between the electrical signal input to said optical modulation signal generating units and the electrical signal output from said optical/electric converter to generate the multi-valued modulation optical signal, having a matched phase, being output from said optical combiner.

13. A modulation apparatus, comprising:
a plurality of modulation signal generators to each output a modulation optical signal;
at least one first controller to control optical intensity of at least one of the modulation optical signals;
a plurality of detectors to detect optical intensity of the modulation optical signals being output from the plurality of modulation signal generators and the first controller;
a second controller to control the at least first controller to increase or decrease intensity, towards a predetermined value, of the at least one of the modulation optical signals based on detected optical intensity of at least one of the modulation optical signals not having optical intensity being controlled by said first controller; and
an optical combiner to combine the at least one of the modulation optical signals having optical intensity being controlled by the first controller and the at least one of the modulation optical signals not having optical intensity being controlled by said first controller to output a multi-valued modulation optical signal.

14. A modulation apparatus comprising:
a plurality of modulation signal generators to each output a modulation optical signal;
a plurality of delays to each introduce delay to a corresponding output modulation optical signal based on a control signal;
an optical combiner to combine the delayed modulation optical signals to output a multi-valued modulation optical signal;
a converter to convert a portion of the multi-valued modulation optical signal into an electric signal; and
a plurality of controllers, each controller to detect a correlation between the modulation optical signal being output from each optical modulation signal generator and the electric signal being output from said converter, the plurality of controllers to each output the control signal to a corresponding one of said delays based on the detected correlation value.

15. A method for generating a modulated signal, comprising:
generating a plurality of modulation optical signals;
adjusting optical intensity of at least one of the modulation optical signals;
detecting optical intensity of the modulation optical signals including the at least one having adjusted optical intensity;
increasing or decreasing intensity, towards a predetermined value, of the at least one of the modulation optical signals having adjusted optical intensity based on detected optical intensity of at least one of the modulation optical signals not having adjusted optical intensity; and
combining the at least one of the modulation optical signals having adjusted optical intensity and the at least one of the modulation optical signals not having adjusted optical intensity to output a multi-valued modulation optical signal.

* * * * *